Sept. 22, 1964  E. NASSOUR  3,150,218
DEVICE FOR AND METHOD OF MAKING A SERIES OF INANIMATE OBJECTS
HAVING PORTIONS IN RELATIVELY DIFFERENT POSTURES
Filed Aug. 17, 1959  2 Sheets-Sheet 2

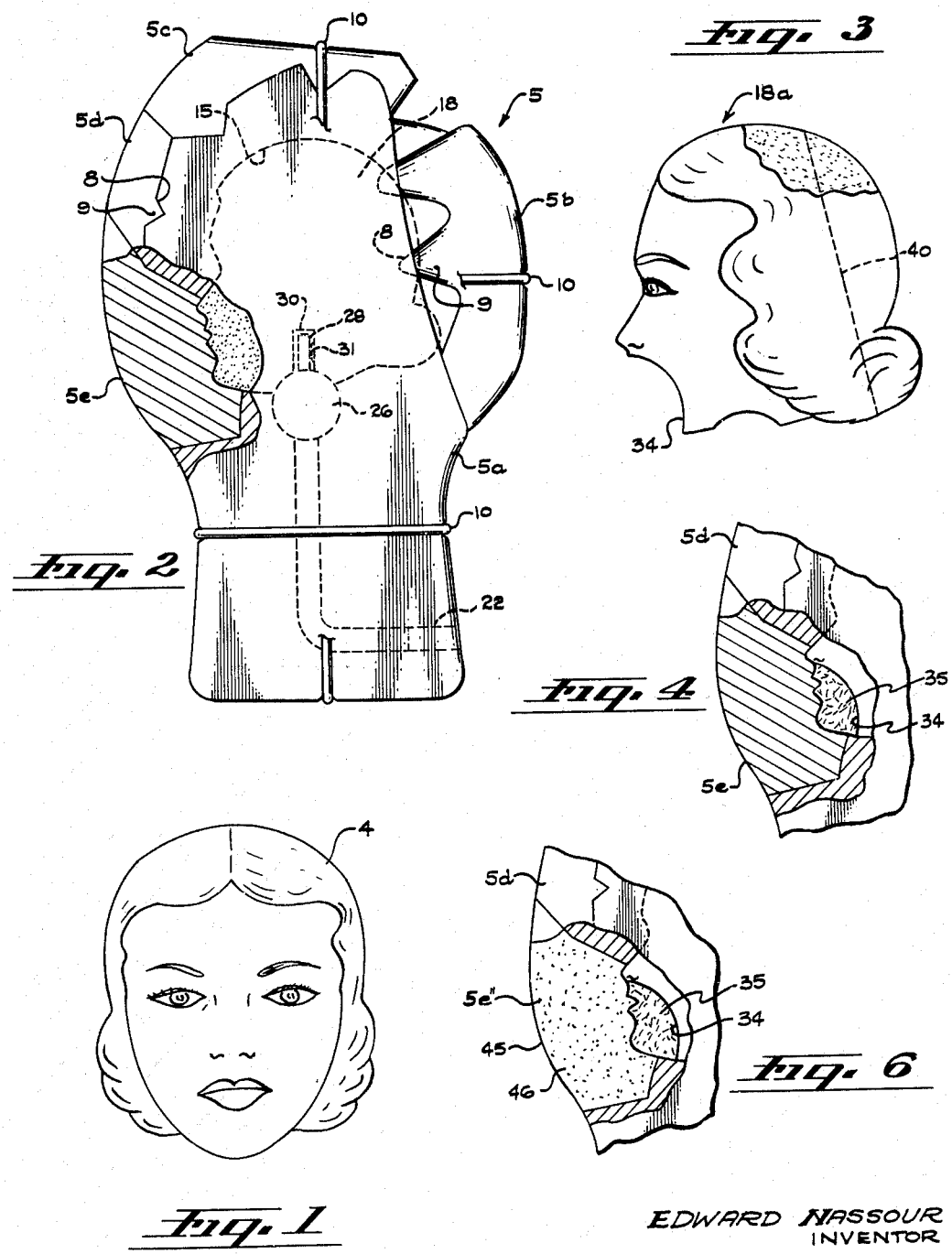

EDWARD NASSOUR
INVENTOR

BY Mason & Graham

ATTORNEYS

United States Patent Office 3,150,218
Patented Sept. 22, 1964

3,150,218
DEVICE FOR AND METHOD OF MAKING A SERIES OF INANIMATE OBJECTS HAVING PORTIONS IN RELATIVELY DIFFERENT POSTURES
Edward Nassour, 8460 W. 3rd St., Los Angeles, Calif.
Filed Aug. 17, 1959, Ser. No. 834,145
4 Claims. (Cl. 264—225)

My invention has to do with the art of making animated pictures by successively photographing inanimate figures or objects, and relates more particularly to a method of making objects to be photographed in relatively different aspects of animation.

In producing animated pictures by making successive photographs of inanimate objects, it is of course necessary that all the objects photographed be exactly alike except for the contour or posture changes necessary to depict the desired steps of animation. For instance, if a close-up picture is to be made depicting the animation of figures occurring in the course of talking or smiling, the heads of the various figures used for the complete sequence of photographic shots must be duplicates except for different mouth or other facial expressions.

It is an object of my invention to provide a method of making a series of photographs to be successively photographed wherein, although it is only necessary to provide one master object or pattern, all the objects of the series will be duplicates of the master figure except for the variations necessary to provide the desired animation.

It is also an object of my invention to provide a method of making a series of objects to be successively photographed wherein, although it is only necessary to provide one master object or pattern, all the objects of the series will be duplicates of the master object or pattern except for the posture variations necessary to provide the desired animation.

It is also an object of my invention to provide a novel method of producing an animated picture by use of inanimate objects or figures.

A still further object is to provide an efficient, speedy and economical method of making animated pictures by photographing inanimate objects.

A more specific object is to provide a method of producing an animated picture by the use of a series of inanimate objects or figures wherein, for each successive photograph of an animated series, an object is produced by a novel way of altering a localized portion of a casting made from the master object.

It is also an object to provide a novel mold device for making such objects.

For the purpose of explaining to those skilled in the art how to practice my invention, I shall now describe presently preferred embodiments, steps and sequences of steps employed in carrying out the invention in the making of a series of heads for figures each having a relatively different localized contour or posture, for which purpose I shall refer to the accompanying drawing wherein:

FIG. 1 is a front elevational view of a sculptured master head or pattern;

FIG. 2 is a view partly in section and partly in side elevation showing a mold made from the pattern of FIG. 1 and a casting in the cavity of the mold;

FIG. 3 is a side elevation of the casting as it appears in one stage of my method;

FIG. 4 is a view, partly in section and partly in side elevation, showing the casting at another stage of my method;

FIG. 6 is a fragmentary sectional view showing a step of a variational form of my method;

Figure 5:
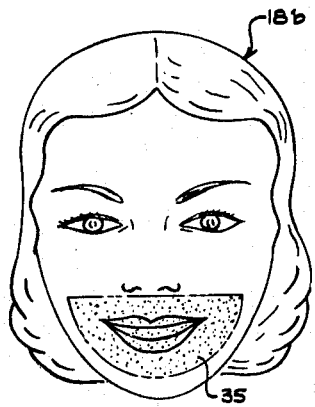
FIG. 5 is a front elevational view showing the casting after its mouth expression has been altered.

Referring now to the drawing, I first produce or obtain a master head 4, which is usually produced by sculpturing. Using this master head as a pattern, I form a sectional mold 5 in accordance with well known practice.

The mold 5 comprises companion opposed side sections 5a, a back section 5b, a top section 5c, an eye area section 5d and a mouth area section 5e. Said various sections have inter-engaging recesses 8 and protuberances 9 to insure their proper registry and positioning. The mold sections may be retained in assembly by binder strings or wires 10, or in any other suitable manner. Said mold sections together define a cavity 15 conforming to the master head 4, and are therefore shaped to form a cast head 18 adapted to be mounted on a body of a figure, not shown For the purpose of facilitating mounting the cast head on said body, each of the side sections 5a of the mold has an L-shaped, semi-circular recess 20, which recesses register with each other and together define an L-shaped recess 22 of round cross section to receive an L-shaped core supporting bar 24 of round cross section, whose top end carries a ball 26 having a radial projection 28 frictionably slidably engageable in a metal ferrule 30 secured in the bottom portion of the casting 18. So that the material of which the casting is composed may lock the ferrule against axial escape, I provide a recess 31 in the exterior surface of the ferrule to receive some of the casting material.

After having made the master head 4 and formed the mold 5 therefrom, I assemble together all the mold sections except one, preferably the back section 5b. I then introduce into the cavity, through the opening provided by omission of the mold section 5b, a suitable casting material, many of which are well known in the art. For instance, a conventional modeling clay, well known in the art, or plaster of Paris, may be used. I then place the omitted mold section in proper position in the assembly, thus forming the casting 18 (FIG. 2).

After the material of the casting 18 is hardened sufficiently to permit it to be removed from the mold, I disassemble the mold sections, remove the casting therefrom and place the casting on a suitable body after which I photograph the complete figure to produce the first photograph of an animated series.

Next, I use a suitable tool, such as a knife, to cut away, along the line 34 (FIG. 3) and remove the material forming the mouth portion of the casting (the casting then having the shape shown in FIG. 3 and designated 18a), and replace the removed material with a deposit 35 (FIGS. 4 and 5) of fresh casting material. While the material 35 is still in a plastic or formable state, I reassemble the mold sections about the casting 18, as shown in FIG. 2, to reform the mouth area in its original shape. Then, while the material 35 is still in a plastic state, I remove the casting 18 from the mold and, as by the use of the fingers, manually alter the contour of the mouth to the extent necessary to depict the next stage of the animation, and then photograph the thus altered head on a figure.

For each successive photograph necessary to complete the animated series, the material 35, constituting the mouth portion of the casting, may be removed from the casting along the line 34, as before described, and a new deposit of plastic material made, and the newly deposited material is molded into the original shape of the mouth portion of the casting 18, in the manner before described, and then is reformed, in the manner heretofore described, to produce the desired extent of animation, after which it is photographed on a body.

Where it is desired to provide a separate, permanent head casting for each of the respective stages of animation, the following variational procedure is followed:

After the mold 5 has been made from the master head, I use the mold to produce a plurality of identical castings 18—corresponding in number to the number of stages of the animation desired to be photographed. One of those castings constitutes the head depicting the beginning of the animation series and may be retained intact. Then, to provide permanent heads for the respective remaining stages of the animation I proceed as follows:

I take one of the castings 18, remove therefrom the material forming the mouth portion by severing it along the line 34, as before described, and also remove the back portion of the head casting by severing it along the broken line 40, FIG. 3, after which I remove sufficient material from the interior of the casting to provide a passageway therethrough extending between the back opening and the mouth opening thus provided. I then reassemble the mold sections 5a, 5c, 5d, and 5e about said casting and introduce a fresh deposit 35 of plastic material into the casting and against the mold section 5e. I then remove the mold section 5e, and, while the newly introduced material is still in a plastic state, I alter the mouth outline of the casting, as shown in FIG. 5, to the extent necessary for the second animation step of the series, which I preferably do manually by using the fingers.

Next, while the material 35 is still in a plastic state, I substitute, for the removed mold section 5e in the mold assembly, a matrix 45 carrying mold forming material 46, such as plaster of Paris (FIG. 6). After the mold material 46 becomes hardened the matrix is removed and the material 46 becomes a new mold section 5″ of the mouth area.

Figure 8:
FIG. 8 is a front elevational view of a head casting as it appears when removed from the mold shown in FIG. 7.
Figure 7:
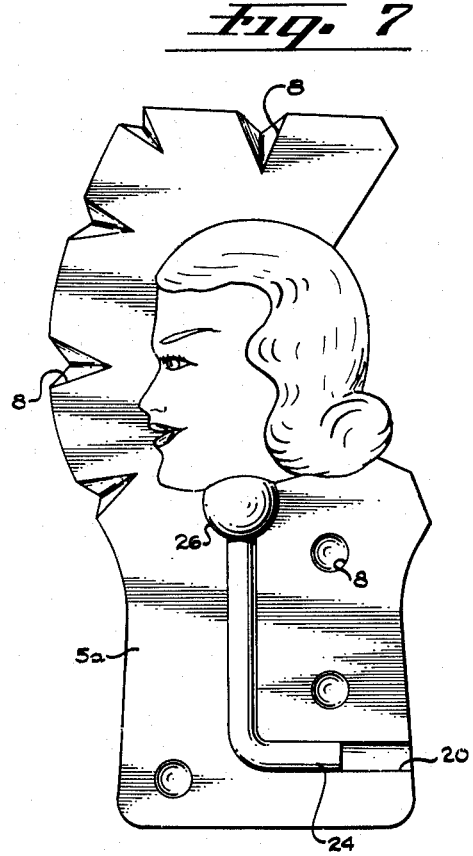
FIG. 7 is a side elevational view showing another step of a variational form of my invention.

Then I prefer to disassemble the mold and remove the casting therefrom and, after reassembling the mold sections, I make a new casting 18c therein which, after its removal from the mold appears as shown in FIG. 8, in which condition it is ready to be placed on a body and photographed.

This procedure is continued until a complete set of head castings has been made which differ from each other only in the expression or contour of the mouth area. After I have thus produced a complete set of the heads, they are sequentially photographed in position on a desired body, to produce a complete series of photographs.

I claim:

1. The method of producing a series of inanimate objects each simulating a head for the purpose of enabling said objects to be successively photographed in relatively different postures of animation, comprising providing a casting of said object in the posture first to be photographed, removing from said casting a localized portion thereof which is to be animated, replacing said removed portion with a deposit of plastic material, shaping said material to duplicate the posture of said localized portion originally possessed by said casting, and, while said material is in a plastic state, reshaping the same to have the posture which said localized portion is to have when said object is next photographed.

2. The method of producing a series of inanimate objects, each simulating a head, for the purpose of enabling said objects to be successively photographed in relatively different postures of animation, comprising providing a casting of said object in the posture first to be photographed, removing from said casting the back portion thereof as well as a part of the face portion thereof to be animated, forming a passageway through said casting from said back portion to said face portion, replacing said removed face portion with a deposit of plastic material while shaping said material to duplicate the posture of said face portion originally possessed by said casting, and, while said material is in a plastic state, reshaping said face portion to have the posture which it is to have when said object is next photographed.

3. The method of producing a series of inanimate objects, for the purpose of enabling said objects to be successively photographed in relatively different postures of animation, providing a pair of duplicate castings of said object in the posture first to be photographed, removing from one of said castings a localized portion thereof which is to be animated, replacing the said removed portion with a deposit of plastic material while shaping said material to duplicate the posture of said localized portion originally possessed by said casting, reshaping said localized portion, while said material is in a plastic state, to have the next successive posture of animation, and making a casting duplicating said last named casting.

4. The method of producing a series of inanimate objects, each simulating a head, for the purpose of enabling said objects to be successively photographed in relatively different postures of animation, comprising making a pattern of said object in the posture first to be photographed, using said pattern to form a sectional mold one of whose sections defines the mouth portion of said object, forming a casting of said object in said mold, removing the mouth portion from said casting, replacing said removed portion with a deposit of plastic material while shaping said material to duplicate the posture of said mouth portion originally possessed by said casting, reshaping said mouth portion, while said material is in a plastic state, to have the next successive posture of animation, making a new mold section conforming to said reshaped mouth portion, then using said mold containing said new mold section to make a new casting of said object.

References Cited in the file of this patent

UNITED STATES PATENTS

| | | |
|---|---|---|
| 803,005 | Mayer | Oct. 31, 1905 |
| 996,784 | Moreau | July 4, 1911 |
| 2,124,767 | Dawn | July 26, 1938 |
| 2,229,878 | Wilson | Jan. 28, 1941 |
| 2,343,238 | Manning et al. | Mar. 7, 1944 |
| 2,422,325 | Wheelon | June 17, 1947 |
| 2,424,235 | Hoffer | July 22, 1947 |
| 2,545,210 | Moore | Mar. 13, 1951 |
| 2,612,461 | Hallgren | Sept. 30, 1952 |
| 2,614,955 | Halsall | Oct. 21, 1952 |
| 2,620,852 | Forbush | Dec. 9, 1952 |
| 2,671,446 | Mann | Mar. 9, 1954 |
| 2,684,503 | Silver | July 27, 1954 |
| 2,919,502 | Henry | Jan. 5, 1960 |

OTHER REFERENCES

A.P.C. application of Morioka, Serial No. 366,503, published June 15, 1943.